US010486070B2

(12) United States Patent
Fukuda et al.

(10) Patent No.: US 10,486,070 B2
(45) Date of Patent: Nov. 26, 2019

(54) PLAY TIME RECORDING DEVICE, PLAY TIME RECORDING METHOD, PROGRAM, AND INFORMATION STORAGE MEDIUM

(71) Applicant: Sony Interactive Entertainment Inc., Tokyo (JP)

(72) Inventors: Shizuto Fukuda, Tokyo (JP); Hisao Wada, Tokyo (JP); Shinji Aizawa, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 9 days.

(21) Appl. No.: 15/119,286

(22) PCT Filed: Aug. 28, 2014

(86) PCT No.: PCT/JP2014/072607
§ 371 (c)(1),
(2) Date: Aug. 16, 2016

(87) PCT Pub. No.: WO2015/129077
PCT Pub. Date: Sep. 3, 2015

(65) Prior Publication Data
US 2017/0007929 A1    Jan. 12, 2017

(30) Foreign Application Priority Data
Feb. 26, 2014   (JP) ................................. 2014-035941

(51) Int. Cl.
*A63F 13/75* (2014.01)
*A63F 13/44* (2014.01)
*A63F 13/52* (2014.01)
*A63F 13/847* (2014.01)
(Continued)

(52) U.S. Cl.
CPC ............ *A63F 13/75* (2014.09); *A63F 13/335* (2014.09); *A63F 13/44* (2014.09); *A63F 13/49* (2014.09);
(Continued)

(58) Field of Classification Search
CPC ........ A63F 13/75; A63F 13/335; A63F 13/44; A63F 13/49; A63F 13/497; A63F 13/52; A63F 13/798; A63F 13/847; A63F 13/95
See application file for complete search history.

(56) References Cited

U.S. PATENT DOCUMENTS

2012/0221514 A1*  8/2012  Knight ............. G06F 17/30038
                                                      707/610
2014/0210704 A1*  7/2014  Chou .................... G06F 3/017
                                                      345/156

FOREIGN PATENT DOCUMENTS

JP    2006-149649    6/2006
JP    2006-254971    9/2006
(Continued)

OTHER PUBLICATIONS

International Preliminary Report on Patentability dated Sep. 9, 2016, from the corresponding PCT/JP2014/072607.
(Continued)

*Primary Examiner* — Werner G Garner
(74) *Attorney, Agent, or Firm* — Katten Muchin Rosenman LLP

(57) ABSTRACT

A play time recording device, a play time recording method, a program, and an information storage medium are provided which enable a user to record a play time in a game according to settings without performing an explicit operation. A data obtaining section (56) obtains setting data in which an event serving as timing of starting or ending measurement of a play time in a game to be played is set. A detecting section (64) detects an occurrence of the event set in the setting data during play of the game. A time recording section (66) records time data indicating a time between timing of the occurrence of the event and predetermined timing.

7 Claims, 13 Drawing Sheets

(51) Int. Cl.
    *A63F 13/49*       (2014.01)
    *A63F 13/95*       (2014.01)
    *A63F 13/335*     (2014.01)
    *A63F 13/798*     (2014.01)
    *A63F 13/497*     (2014.01)

(52) U.S. Cl.
    CPC ............ *A63F 13/497* (2014.09); *A63F 13/52* (2014.09); *A63F 13/798* (2014.09); *A63F 13/847* (2014.09); *A63F 13/95* (2014.09)

(56) References Cited

FOREIGN PATENT DOCUMENTS

| | | |
|---|---|---|
| JP | 2007-117768 | 5/2007 |
| JP | 2007-117772 | 5/2007 |

OTHER PUBLICATIONS

International Search Report dated Oct. 14, 2014 from corresponding Application No. PCT/JP2014/072607.

Takeshi Saito, et. al., "Gran Turismo 5 Koshiki Guidbook The Best Navigator", first edition, Enterbrain, Inc., Aug. 30, 2011, pp. 14-17, 21-22, 28, 33, 37-38.

[Online], Sony Computer Entertainment Inc., Dec. 5, 2013, Gran Turismo 6 Manual, [retrieved on Sep. 18, 2014], Internet <URL:http://www.gran-turismo.com/jp/gt6/manual/>, particularly, refer to the paragraph of 'online'-> open lobby, 'online race'.

"OBIST Inc., Armored core 4 The Complete Guide", first edition, Kabushiki Kaisha Media Works, Mar. 20, 2007, p. 037, refer to the paragraph of 'Regulation no Download'.

"Gran Turismo 6", Dengeki PlayStation, Dec. 26, 2013, vol. 20, No. 4, pp. 152-155, particularly, refer to page 153.

\* cited by examiner

FIG.2A

| REGULATION ID | | 001 |
|---|---|---|
| GAME TITLE DATA | | GAME A |
| REGULATION NAME DATA | | MAPS 1 AND 2, TIME ATTACK |
| MOVING IMAGE SAVING NECESSITY DATA | | 1 |
| USABLE CONTROLLER DATA | | ONLY STANDARD CONTROLLER |
| TIMER EVENT DATA | FIRST START EVENT DATA | TIME OF SELECTION OF NEW GAME |
| | FIRST END EVENT DATA | TIME OF CLEARING MAP 1 |
| | SECOND START EVENT DATA | TIME OF CLEARING MAP 1 |
| | SECOND END EVENT DATA | TIME OF CLEARING MAP 2 |

FIG.2B

| REGULATION ID | | 002 |
|---|---|---|
| GAME TITLE DATA | | GAME B |
| REGULATION NAME DATA | | FULL GAME SPEEDRUN |
| MOVING IMAGE SAVING NECESSITY DATA | | 0 |
| USABLE CONTROLLER DATA | | NOT SPECIFIED |
| TIMER EVENT DATA | FIRST START EVENT DATA | TIME OF SELECTION OF NEW GAME |
| | FIRST END EVENT DATA | TIME OF DEFEATING FINAL BOSS |

FIG.2C

| REGULATION ID | 003 |
|---|---|
| GAME TITLE DATA | GAME C |
| REGULATION NAME DATA | BOSS DEFEATING TIME ATTACK |
| MOVING IMAGE SAVING NECESSITY DATA | 1 |
| USABLE CONTROLLER DATA | ONLY STICK CONTROLLER |
| TIMER EVENT DATA — FIRST START EVENT DATA | TIME OF START OF FINAL STAGE |
| TIMER EVENT DATA — FIRST END EVENT DATA | TIME OF DEFEATING FINAL BOSS |
| ENVIRONMENT DATA FILE | ... |

| REGULATION NAME: | MAPS 1 AND 2, TIME ATTACK | |
|---|---|---|
| GAME TITLE: | GAME A ▽ | |
| NECESSITY OF SAVING MOVING IMAGE: | ✓ | |
| INPUT DEVICE: | ONLY STANDARD CONTROLLER ▽ | |
| TIMER EVENT 1 (START): | TIME OF SELECTION OF NEW GAME ▽ | DELETE |
| TIMER EVENT 1 (END): | TIME OF CLEARING MAP 1 ▽ | |
| TIMER EVENT 2 (START): | TIME OF CLEARING MAP 1 ▽ | DELETE |
| TIMER EVENT 2 (END): | TIME OF CLEARING MAP 2 ▽ | |
| | ADD TIMER EVENT | |
| ENVIRONMENT FILE NAME: | | |

RB: REGISTER  CB: CANCEL  SB: SHARE

| | |
|---|---|
| REGULATION NAME: | MAPS 1 AND 2, TIME ATTACK |
| GAME TITLE: | GAME A |
| WHETHER OR NOT TO SAVE MOVING IMAGE: | SAVE |
| INPUT DEVICE: | ONLY STANDARD CONTROLLER |
| TIMER EVENT 1 (START): | TIME OF SELECTION OF NEW GAME |
| TIMER EVENT 1 (END): | TIME OF CLEARING MAP 1 |
| TIMER EVENT 2 (START): | TIME OF CLEARING MAP 1 |
| TIMER EVENT 2 (END): | TIME OF CLEARING MAP 2 |

OK — OB

CANCEL — CB

| PLAY TIME ID | | 0001 |
|---|---|---|
| REGULATION ID | | 001 |
| PLAYER ID | | PLAYER A |
| REGION ID | | 101 |
| PLAY TIME DATA | FIRST STARTING TIMING DATA | JAN 31, 2014 1:01:10 |
| | FIRST ENDING TIMING DATA | JAN 31, 2014 1:04:20 |
| | FIRST PLAY TIME LENGTH DATA | 3 MINUTES AND 10 SECONDS |
| | SECOND STARTING TIMING DATA | JAN 31, 2014 1:04:20 |
| | SECOND ENDING TIMING DATA | JAN 31, 2014 1:08:55 |
| | SECOND PLAY TIME LENGTH DATA | 4 MINUTES AND 35 SECONDS |
| | TOTAL PLAY TIME LENGTH DATA | 7 MINUTES AND 45 SECONDS |
| MOVING IMAGE ID | | a123b |

FIG.6B

| PLAY TIME ID | | 0002 |
|---|---|---|
| REGULATION ID | | 002 |
| PLAYER ID | | PLAYER B |
| REGION ID | | 101 |
| PLAY TIME DATA | FIRST STARTING TIMING DATA | FEB 4, 2014 1:13:12 |
| | FIRST ENDING TIMING DATA | FEB 4, 2014 1:59:16 |
| | TOTAL PLAY TIME LENGTH DATA | 46 MINUTES AND 4 SECONDS |

FIG.6C

| PLAY TIME ID | | 0003 |
|---|---|---|
| REGULATION ID | | 003 |
| PLAYER ID | | PLAYER C |
| REGION ID | | 101 |
| PLAY TIME DATA | FIRST STARTING TIMING DATA | FEB 7, 2014 1:13:12 |
| | FIRST ENDING TIMING DATA | FEB 4, 2014 1:18:50 |
| | TOTAL PLAY TIME LENGTH DATA | 5 MINUTES AND 38 SECONDS |
| MOVING IMAGE ID | | c42fd |

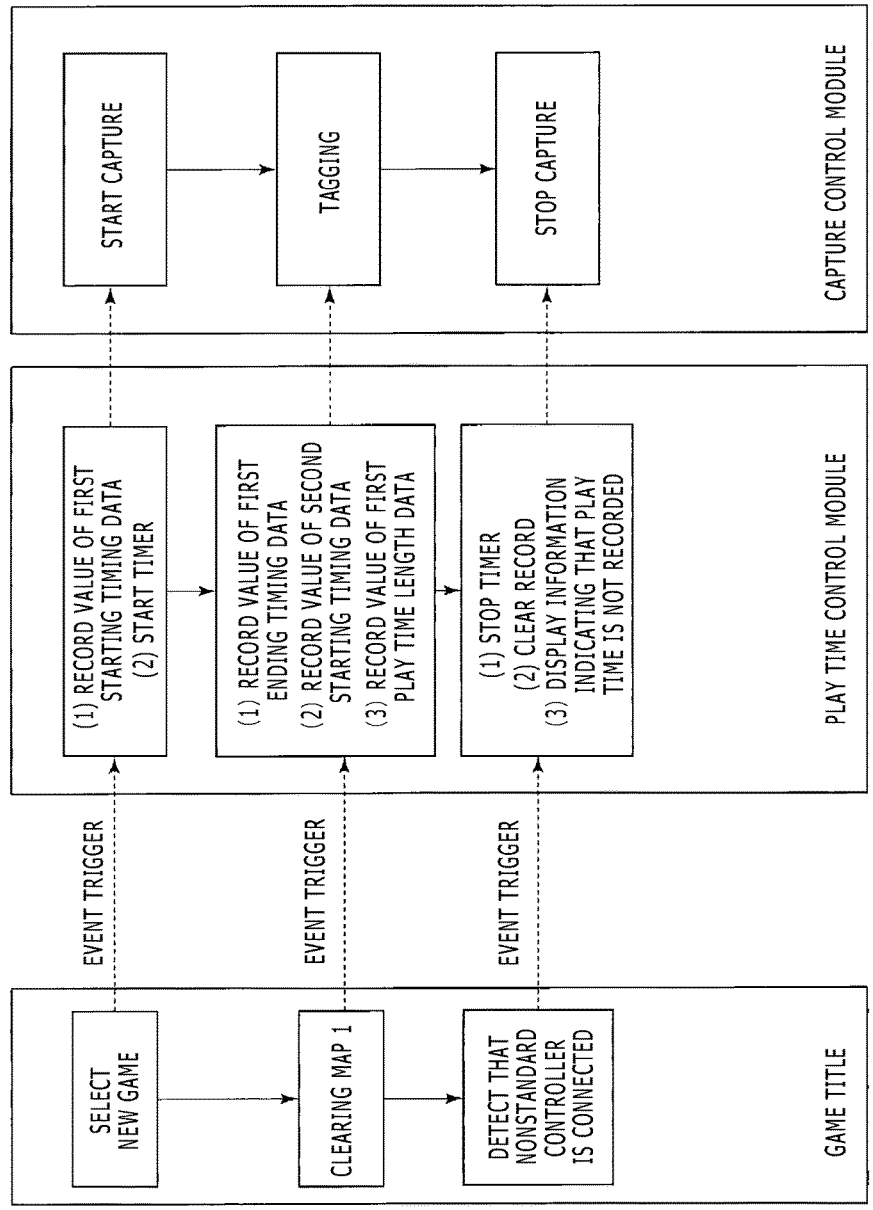

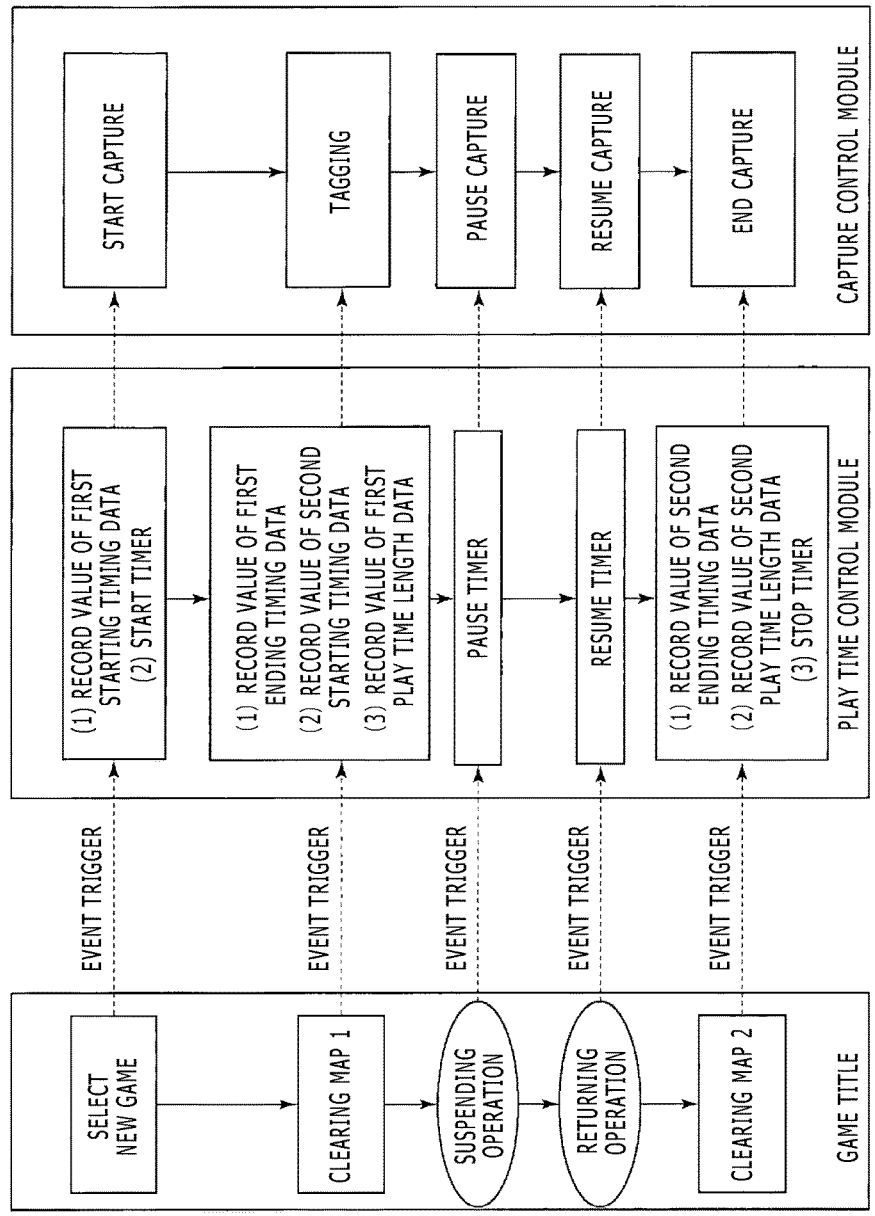

PLAY TIME RECORDING DEVICE, PLAY TIME RECORDING METHOD, PROGRAM, AND INFORMATION STORAGE MEDIUM

TECHNICAL FIELD

The present invention relates to a play time recording device, a play time recording method, a program, and an information storage medium.

BACKGROUND ART

In recent years, competitions to compete in play time in games, such as a real-time speedrun and a time attack, have been taking place as one of new ways of enjoying the games. Such competitions are taking place also in games not supporting a real-time speedrun, a time attack, or the like as a system within the games.

SUMMARY

Technical Problems

Even in a case of a game supporting a real-time speedrun, a time attack, or the like as a system within the game, a player, an organizer, or the like cannot set a rule (regulation) or the like for the competition appropriately. Then, in order to record play times in the game according to settings, players participating in the competition need to measure the play times by an explicit operation. However, when the players participating in the competition measure the play times by an explicit operation, strictness of the measurement of the play times depends on the operation of each player. It is therefore difficult to ensure the strictness of the measurement of the play times in the game.

The present invention has been made in view of the above problems. It is an object of the present invention to provide a play time recording device, a play time recording method, a program, and an information storage medium that enable a user to record a play time in a game according to settings without performing an explicit operation.

Solution to Problems

In order to solve the above problems, according to the present invention, there is provided a play time recording device including a setting data obtaining section obtaining setting data in which an event serving as timing of starting or ending measurement of a play time in a game to be played is set, a detecting section detecting an occurrence of the event set in the setting data during play of the game, and a time recording section recording time data indicating a time between timing of the occurrence of the event and predetermined timing.

In addition, according to the present invention, there is provided a play time recording method including a step of obtaining setting data in which an event serving as timing of starting or ending measurement of a play time in a game to be played is set, a step of detecting an occurrence of the event set in the setting data during play of the game, and a step of recording time data indicating a time between timing of the occurrence of the event and predetermined timing.

In addition, according to the present invention, there is provided a program for making a computer perform a step of obtaining setting data in which an event serving as timing of starting or ending measurement of a play time in a game to be played is set, a step of detecting an occurrence of the event set in the setting data during play of the game, and a step of recording time data indicating a time between timing of the occurrence of the event and predetermined timing.

In addition, according to the present invention, there is provided a computer readable information storage medium storing a program for making a computer perform a step of obtaining setting data in which an event serving as timing of starting or ending measurement of a play time in a game to be played is set, a step of detecting an occurrence of the event set in the setting data during play of the game, and a step of recording time data indicating a time between timing of the occurrence of the event and predetermined timing.

In the present invention, the time data indicating the time between the timing of the occurrence of the event set in the setting data and the predetermined timing is recorded. Thus, a user can record the play time in the game according to settings without performing an explicit operation.

In one mode of the present invention, the setting data obtaining section obtains the setting data in which a start event as an event serving as timing of starting the measurement of the play time in the game and an end event as an event serving as timing of ending the measurement of the play time are set, the detecting section detects an occurrence of the start event and an occurrence of the end event, the start event and the end event being set in the setting data, during the play of the game, and the time recording section records the time data indicating a time from timing of the occurrence of the start event to timing of the occurrence of the end event, the occurrence of the start event and the occurrence of the end event being detected by the detecting section.

In addition, in one mode of the present invention, the play time recording device further includes a moving image recording section recording, in association with the time data, a moving image showing play contents of the game between the timing of the occurrence of the event and the predetermined timing.

In addition, in one mode of the present invention, the setting data obtaining section obtains the setting data in which a rule violation to be detected is set, the detecting section detects an occurrence of the rule violation set in the setting data in a period between the timing of the occurrence of the event and the predetermined timing, and the time recording section records, in association with the time data, data indicating occurrence or nonoccurrence of the rule violation in the period between the timing of the occurrence of the event and the predetermined timing.

Alternatively, the setting data obtaining section obtains the setting data in which a rule violation to be detected is set, the detecting section detects an occurrence of the rule violation set in the setting data in a period between the timing of the occurrence of the event and the predetermined timing, and the detecting section cancels the detection of the occurrence of the event set in the setting data according to the detection of the occurrence of the rule violation.

In addition, in one mode of the present invention, the setting data obtaining section obtains the setting data including environment data indicating an environment of the game at a time of starting the measurement of the play time, the play time recording device further includes a loading section loading the environment data and reproducing the environment of the game, the environment being indicated by the environment data, and the time recording section records the time data indicating a time between timing in which the environment data is loaded and the predetermined timing.

In addition, in one mode of the present invention, the play time recording device further includes a setting data generating section generating the setting data, and a setting data transmitting section transmitting the setting data to a device that records the time between the timing of the occurrence of the event set in the setting data and the predetermined timing.

BRIEF DESCRIPTION OF DRAWINGS

FIG. 2A is a diagram showing an example of regulation data.

FIG. 2B is a diagram showing an example of regulation data.

FIG. 2C is a diagram showing an example of regulation data.

FIG. 3 is a diagram showing an example of a registration page.

FIG. 4 is a diagram showing an example of a selection page.

FIG. 5 is a diagram showing an example of a detail page.

FIG. 6A is a diagram showing an example of play time management data.

FIG. 6B is a diagram showing an example of play time management data.

FIG. 6C is a diagram showing an example of play time management data.

FIG. 11 is a diagram schematically showing a concrete example in which the processing shown in FIG. 9 is performed.

FIG. 12 is a diagram schematically showing a concrete example in which the processing shown in FIG. 9 is performed.

DESCRIPTION OF EMBODIMENT

One embodiment of the present invention will hereinafter be described in detail with reference to the drawings.

Figure 1:
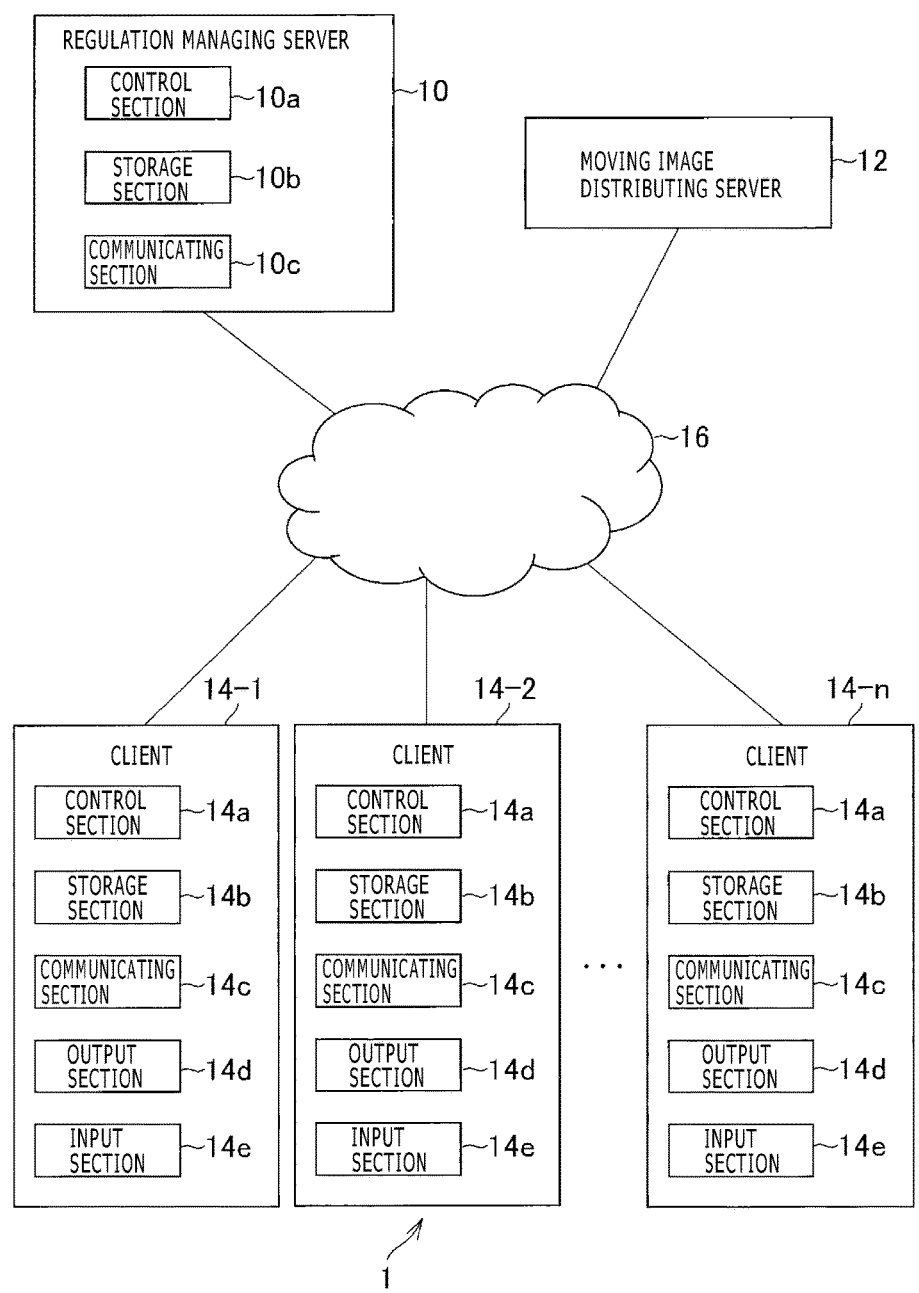
FIG. 1 is a diagram showing an example of a general constitution of a game system according to one embodiment of the present invention.

FIG. 1 is a diagram showing an example of a general constitution of a game system 1 according to one embodiment of the present invention. As shown in FIG. 1, the game system 1 according to the present embodiment includes a regulation managing server 10, a moving image distributing server 12, and a client 14 (14-1 to 14-n), which are each configured centered on a computer. The regulation managing server 10, the moving image distributing server 12, and the client 14 are connected to a computer network 16 such as the Internet. Then, the regulation managing server 10, the moving image distributing server 12, and the client 14 are capable of communicating with each other.

As shown in FIG. 1, the regulation managing server 10 includes for example a control section 10a, a storage section 10b, and a communicating section 10c. The control section 10a is for example a program control device such as a central processing unit (CPU). The control section 10a performs various kinds of information processing according to a program stored in the storage section 10b. The storage section 10b is for example a storage element such as a read only memory (ROM) and a random access memory (RAM), a hard disk drive, and the like. The communicating section 10c is for example a communication interface such as a network board for sending and receiving data to and from the moving image distributing server 12 and the client 14 via the computer network 16. The regulation managing server 10 transmits and receives information to and from the moving image distributing server 12 and the client 14 through the communicating section 10c.

The moving image distributing server 12 stores a moving image uploaded from the client 14, and distributes a moving image stored therein to the client 14 in response to a request from the client 14.

The client 14 is a computer used by a user. The client 14 is for example a personal computer, a game console, a portable game device, a portable information terminal, or the like. In the present embodiment, the program of a game to be played by the user is installed on the client 14. Then, the user of the client 14 plays the game as a player of the game. The client 14 includes for example a control section 14a, a storage section 14b, a communicating section 14c, an output section 14d, and an input section 14e. The control section 14a is for example a program control device such as a CPU. The control section 14a performs various kinds of information processing according to a program stored in the storage section 14b. The control section 14a according to the present embodiment also includes a graphics processing unit (GPU) that renders an image in a frame buffer on the basis of a graphics command and data supplied from the CPU. The storage section 14b is for example a storage element such as a ROM and a RAM, a hard disk drive, and the like. The program executed by the control section 14a and the like are stored in the storage section 14b. In addition, the region of the frame buffer in which an image is rendered by the GPU is secured in the storage section 14b according to the present embodiment. The communicating section 14c is for example a communication interface for sending and receiving data to and from the regulation managing server 10 and the moving image distributing server 12 via the computer network 16. The client 14 transmits and receives information to and from the regulation managing server 10, the moving image distributing server 12, and other clients 14 through the communicating section 14c. The output section 14d is for example a display section such as a display that display-outputs information and an audio output section such as a speaker that outputs audio according to an instruction input from the control section 14a. The input section 14e is for example a game controller, a touch pad, a mouse, a keyboard, a microphone, a camera, and the like that output a description of an operation performed by the user to the control section 14a.

In the present embodiment, the user of the client 14 can participate in a competition to compete in play time in a game according to settings such as a rule (regulation) set by the user or the organizer of the competition, such as a real-time speedrun or a time attack. The program of the game may be installed on the client 14 in advance, or may be stored in the regulation managing server 10. When the program of the game is stored in the regulation managing server 10, the program is executed after being downloaded and installed onto the client 14.

In the present embodiment, settings related to competitions to compete in play time are managed by regulation data illustrated in FIG. 2A, FIG. 2B, and FIG. 2C. The regulation data according to the present embodiment includes a regulation identification (ID), game title data, regulation name data, moving image saving necessity data, usable controller data, and timer event data.

The regulation ID is identifying information of the regulation data. The game title data indicates the title of a game in which a play time is recorded. The regulation name data indicates the name of settings related to the competition to compete in the play time, or a rule in this case.

The moving image saving necessity data indicates whether or not to record a moving image representing play contents of the game during the play time together with the play time. In the present embodiment, when the play time is recorded on the basis of the regulation data in which "1" is set as a value of the moving image saving necessity data, the moving image representing the play contents of the game during the play time is recorded together with the play time. When the play time is recorded on the basis of the regulation data in which "0" is set as a value of the moving image saving necessity data, on the other hand, the moving image representing the play contents is not recorded. The moving image representing the play contents of the game will hereinafter be referred to as a play moving image.

The usable controller data indicates a controller usable in playing the game. When the value of the usable controller data is "ONLY STANDARD CONTROLLER," for example, not using a standard controller in the play constitutes a rule violation. In addition, when the value of the usable controller data is "ONLY STICK CONTROLLER," for example, not using a stick controller in the play constitutes a rule violation. When the value of the usable controller data is "NOT SPECIFIED," for example, the use of any controller in the play does not constitute a rule violation. When a rule violation occurs in the present embodiment, the play time is not recorded, or data indicating that a rule violation has occurred is recorded in association with the play time, for example.

The timer event data has an event set therein as at least one of starting timing of starting measurement of the play time to be recorded and ending timing of ending the measurement. Hereinafter, an event as the starting timing will be referred to as a start event, and an event as the ending timing will be referred to as an end event. Then, data indicating the start event will be referred to as start event data, and data indicating the end event will be referred to as end event data. As shown in FIG. 2A, the timer event data may include a plurality of combinations of start event data and end event data. The timer event data in the example of FIG. 2A includes first start event data, first end event data, second start event data, and second end event data. In the example of FIG. 2A, a time from timing of selecting a new game to timing of clearing a map 1 and a time from the timing of clearing the map 1 to timing of clearing a map 2 are recorded. In addition, as shown in FIG. 2B and FIG. 2C, one combination of starting timing and ending timing may be set as the timer event data. In this case, the timer event data includes first start event data and first end event data. In the example of FIG. 2B, a time from timing of selecting a new game to timing of defeating a final boss is recorded. In the example of FIG. 2C, a time from timing of starting a final stage to timing of defeating a final boss is recorded.

In addition, as shown in FIG. 2C, the regulation data may include environment data file. The environment data file is a file of environment data such as save data or snapshot data. In the present embodiment, when the user selects regulation data including an environment data file, game play is started after the environment data file is loaded. Thus, same conditions can be provided for a plurality of players participating in the competition according to the rule set in the regulation data. As an example of the conditions in this case, there are for example parameters of a character such as equipment, a status, a level, carried items, a party composition, and a hit point of the character, a position of the character at a time of a start of play, and the like.

It is to be noted that the regulation data shown in FIG. 2A, FIG. 2B, and FIG. 2C is an example, and that for example an event of a start of a battle with a monster or a boss, an event of obtainment of an item, or the like may be set as a timer event. In addition, for example, condition data indicating various kinds of conditions may be included in the regulation data. The conditions in this case include for example a range of a communication band, a process that should be performed other than a game process or a process that should not be performed in the client 14, a range of an amount of resources used, a range of a CPU utilization rate, a range of an amount of access to a hard disk, and the like. Then, it may be determined that a rule violation has occurred when a condition satisfied by condition data is not satisfied. The above-described usable controller data is a kind of condition data, and indicates a condition with regard to a usable controller.

In the present embodiment, the organizer of a competition, an administrator of the regulation managing server 10, and the like can register regulation data in the regulation managing server 10. In addition, in the present embodiment, the user of the client 14 can register regulation data in the client 14 or the regulation managing server 10. FIG. 3 is a diagram showing an example of a registration page 20 for registering regulation data, the registration page 20 being displayed on the output section 14d of the client 14. As shown in FIG. 3, a form for inputting a regulation name and the file name of an environment data file is arranged on the registration page 20. In addition, pull-down menus for setting a game title, an input device, and timer events are arranged on the registration page 20. In the present embodiment, events occurring in a game of a title selected in the pull-down menu for setting a game title can be set in the pull-down menus for setting timer events. In addition, a check box for setting whether or not to save a moving image is arranged on the registration page 20. In addition, buttons for adding or deleting timer events are arranged on the registration page 20. A plurality of combinations of start events and end events can therefore be set in the regulation data. A registering button RB, a canceling button CB, and a sharing button SB are also arranged on the registration page 20 shown in FIG. 3.

When the user clicks the registering button RB after inputting each item, the regulation data generated on the basis of the input contents is stored in the storage section 14b of the client 14. When the user clicks the canceling button CB, the registration of the regulation data is canceled. When the user clicks the sharing button SB after inputting each item, the regulation data generated on the basis of the input contents is transmitted to the regulation managing server 10, and stored in the storage section 10b of the regulation managing server 10. The regulation data registered in the regulation managing server 10 is used by a plurality of users. Incidentally, the regulation managing server 10 may determine whether or not regulation data similar to the transmitted regulation data is already registered in the regulation managing server 10. Then, when it is determined that regulation data similar to the transmitted regulation data is already registered, the regulation managing server 10 may refuse to register the transmitted regulation data.

A character string input on the form for inputting the regulation name on the registration page 20 is set as a value of regulation name data included in the regulation data generated here. In addition, the title selected in the menu for setting a game title on the registration page 20 is set as a value of game title data included in the regulation data. In addition, a value selected in the menu for setting an input device on the registration page 20 is set as a value of usable controller data included in the regulation data. In addition, a value selected in a menu for setting a timer event on the registration page 20 is set as a value of timer event data included in the regulation data. In addition, when the check box for setting whether or not to save a moving image on the registration page 20 is checked, "1" is set as a value of moving image saving necessity data included in the regulation data. When the check box for setting whether or not to save a moving image on the registration page 20 is not checked, "0" is set as the value of the moving image saving necessity data included in the regulation data. In addition, a file having a file name input on the form for inputting an environment file name on the registration page 20 is set as an environment data file included in the regulation data. When no character string is input on the form for inputting an environment file name, no environment data file is included in the regulation data.

Incidentally, only events already achieved by the user of the client 14 may be allowed to be set as timer events on the registration page 20. In this case, the user can generate the regulation data in which an event selected by the user from the already achieved events is set as a value of timer event data. The present embodiment identifies whether or not the user has achieved an event on the basis of trophy data, for example. Here, trophy data refers to data associated with each of predetermined events in a game, the data being stored in the storage section 14b of the client 14 when the program of the game is installed on the client 14. As a value of trophy data, for example either "UNACHIEVED" or "ALREADY ACHIEVED" is set. When an event associated with trophy data occurs in the game played by the user, the value of the trophy data is updated from "UNACHIEVED" to "ALREADY ACHIEVED."

Figure 4:
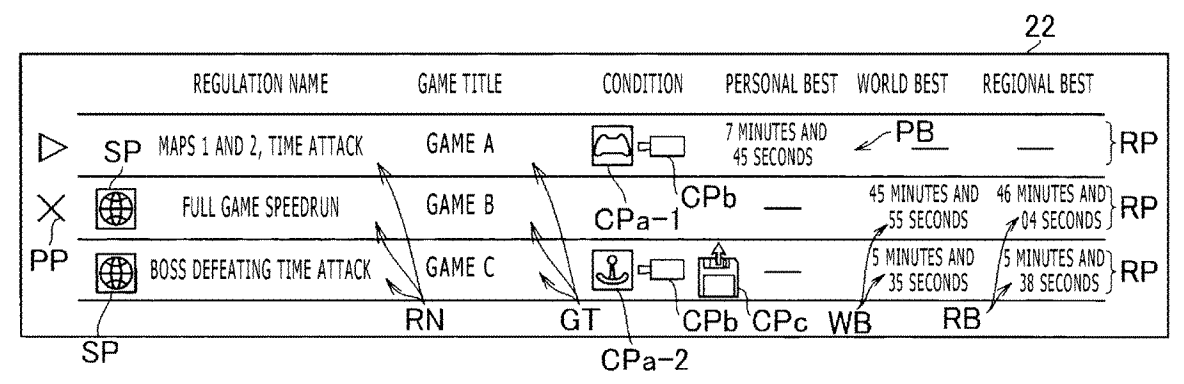

Then, in the present embodiment, for example, the user participates in a competition to compete in play time in the game according to the settings selected by the user via a selection page 22 illustrated in FIG. 4 and a detail page 24 illustrated in FIG. 5, the selection page 22 and the detail page 24 being displayed on the output section 14d of the client 14. Then a play time in the game is recorded.

Regulation images RP associated with respective pieces of regulation data are arranged vertically on the selection page 22 illustrated in FIG. 4. Three regulation images RP are arranged in the example of the selection page 22 shown in FIG. 4. The respective three regulation images RP shown in FIG. 4 are associated, in order from a top, with the regulation data illustrated in FIG. 2A, FIG. 2B, and FIG. 2C. Here, the regulation managing server 10 may for example perform control such that a regulation image RP associated with regulation data most frequently selected by the user is disposed at the top.

A regulation image RP includes a selection prohibiting image PP, a sharing image SP, a regulation name RN, a game title GT, a condition image CP (CPa, CPb, and CPc), a personal best time PB, a world best time WB, and a regional best time RB.

A name represented by the regulation name data included in the associated regulation data is disposed as the regulation name RN. A title represented by the game title data included in the associated regulation data is disposed as the game title GT.

The condition image CP indicates conditions of the competition. In the present embodiment, for example, the condition image CP to be disposed is determined according to the values of the above-described condition data, the value of the moving image saving necessity data, and the environment data file, the condition data, the moving image saving necessity data, and the environment data file being included in the regulation data. In the present embodiment, for example, a condition image CPa is disposed in a regulation image RP associated with a competition that limits usable controllers. In this case, for example, a condition image CPa-1 is disposed in the regulation image RP associated with the regulation data in which the value of the included usable controller data is "ONLY STANDARD CONTROLLER." In addition, a condition image CPa-2 is disposed in the regulation image RP associated with the regulation data in which the value of the included usable controller data is "ONLY STICK CONTROLLER." In addition, in the present embodiment, a condition image CPb is disposed in the regulation images RP associated with the regulation data in which the value of the included moving image saving necessity data is "1." In addition, in the present embodiment, when an environment data file is included in regulation data, a condition image CPc is disposed in the regulation image RP associated with the regulation data.

The personal best time PB represents a best record of the player in question, that is, a shortest play time length of the player in question with regard to the play time in the rule. The world best time WB represents a best record among all of the players participating in the competition, that is, a shortest play time length among all of the players participating in the competition with regard to the play time in the rule. The regional best time RB represents a best record among players belonging to the same region as the player in question, that is, a shortest play time length among the players belonging to the same region as the player in question. Incidentally, no play time length is disposed in a part without a corresponding record.

In addition, a sharing image SP is disposed in regulation images RP associated with the regulation data registered in the regulation managing server 10. That is, a sharing image SP is disposed in the regulation images RP associated with the rules selectable by other clients 14. On the other hand, no sharing image SP is disposed in the regulation image RP associated with the regulation data registered in the storage section 14b of the client 14. That is, no sharing image SP is disposed in the regulation image RP associated with the rule selectable by only the client 14 of the user.

In addition, in the present embodiment, when the user has not achieved one of the events represented by time event data included in associated regulation data, a selection prohibiting image PP is disposed in the regulation image RP associated with the regulation data. As described above, whether or not the user has achieved the event is identified on the basis of trophy data, for example.

In the present embodiment, when the user performs an operation of selecting a regulation image RP in which the selection prohibiting image PP is not disposed, a detail page 24 corresponding to the regulation image RP is displayed on the output section 14d of the client 14.

FIG. 5 shows an example of a detail page 24 displayed when the regulation image RP disposed at a topmost position on the selection page 22 shown in FIG. 4 is selected. As shown in FIG. 5, the values set to the associated regulation data are arranged on the detail page 24. In this case, for example, the value of the regulation name data, the value of the game title data, the value of the usable controller data, and the value of the timer event data are arranged. In addition, when the value of the moving image saving necessity data included in the associated regulation data is "1," "SAVE" is disposed in a section indicating whether or not to save a moving image on the detail page 24. On the other hand, when the value of the moving image saving necessity data included in the associated regulation data is "0," "NOT SAVE" is disposed in the section indicating whether or not to save a moving image on the detail page 24. In addition, when an environment data file is included in the associated regulation data, a character string indicating loading of the environment data file may be disposed on the detail page 24.

An OK button OB and a canceling button CB are also arranged on the detail page 24. When the user clicks the canceling button CB, the displayed page returns to the selection page 22. When the user clicks the OK button OB, on the other hand, a play time is recorded according to the displayed timer events. In the example of FIG. 5, the time from the timing of selecting the new game to the timing of clearing the map 1 and the time from the timing of clearing the map 1 to the timing of clearing the map 2 during the play of a game A are recorded.

In the present embodiment, when measurements of play times with respect to all of the events set in the regulation data selected by the user are all ended, play time management data illustrated in FIG. 6A, FIG. 6B, and FIG. 6C is generated. Then, the play time management data is transmitted to the regulation managing server 10, and stored in the regulation managing server 10.

Play time management data includes a play time ID, a regulation ID, a player ID, a region ID, and play time data. The play time ID is identifying information of the play time management data. The regulation ID of the selected regulation data is set as a value of the regulation ID. Thus, in the present embodiment, the play time management data and the regulation data are associated with each other by the regulation ID. The player ID is identifying information of a player who played the game. The region ID is identifying information of a region to which the player belongs. The play time data indicates a measured play time.

In the present embodiment, the play time data includes at least one combination of starting timing data and ending timing data. Here, the starting timing data indicates timing of starting the measurement of a play time, or timing of occurrence of a start event in this case. The ending timing data indicates timing of ending the measurement of the play time, or timing of occurrence of an end event in this case. The combination of the starting timing data and the ending timing data is associated with a combination of start event data and end event data included in regulation data associated with the play time data. Specifically, for example, timing of occurrence of an event indicated by first start event data is set as a value of first starting timing data, and timing of occurrence of an event indicated by first end event data is set as a value of first ending timing data. In addition, timing of occurrence of an event indicated by second start event data is set as a value of second starting timing data, and timing of occurrence of an event indicated by second end event data is set as a value of second ending timing data.

In addition, in the present embodiment, when the play time data includes a plurality of combinations of starting timing data and ending timing data, play length data associated with each of the combinations is included. Specifically, for example, a length of time from timing indicated by the first starting timing data to timing indicated by the first ending timing data is set as a value of first play length data. In addition, a length of time from timing indicated by the second starting timing data to timing indicated by the second ending timing data is set as a value of second play length data.

Incidentally, in the present embodiment, when the play time data includes only one combination set of starting timing data and ending timing data, the play time data does not include the first play length data.

In addition, in the present embodiment, the play time data includes total play time length data. Here, the total play time length data indicates a sum of times indicated by the play time length data included in the play time data. For example, when the play time data includes the first play time length data and the second play time length data, a sum of lengths of time indicated by respective values of the first play time length data and the second play time length data is set as a value of the total play time length data. Incidentally, there is a case where the play time data includes only one combination set of starting timing data and ending timing data. In this case, a length of time from the timing indicated by the first starting timing data to the timing indicated by the first ending timing data is set as the value of the total play length data. Incidentally, the values of the first play time length data, the second play time length data, and the total play time length data may be identified on the basis of results of measurement by a timer, or may be determined on the basis of the values of the starting timing data and the values of the ending timing data. In addition, the play time management data does not need to include all of the starting timing data, the ending timing data, and the play time length data.

As described above, play time management data is associated with regulation data by a regulation ID. A regulation image RP disposed on the selection page 22 is generated on the basis of the regulation data when there is no play time management data associated with the regulation data associated with the regulation image RP. When the play time management data described above is present, the regulation image RP disposed on the selection page 22 is generated on the basis of the regulation data and at least one piece of play time management data associated with the regulation. For example, a shortest time is identified among times indicated by total play length data included in respective pieces of play time management data including the regulation ID associated with the regulation image RP. Then, the identified time is disposed as a world best time WB in the regulation image RP. In addition, for example, a shortest time is identified among times indicated by total play length data included in respective pieces of play time management data including the regulation ID associated with the regulation image RP and the region ID of the region to which the player in question belongs. Then, the identified time is disposed as a regional best time RB in the regulation image RP.

In addition, in the present embodiment, when a play time is recorded according to regulation data in which the value of moving image saving necessity data is "1," a play moving image during the play time is also recorded. Then, the play moving image is uploaded to the moving image distributing server 12. In this case, in the present embodiment, as shown in FIG. 6A and FIG. 6C, a moving image ID, which is an identifier of the play moving image managed in the moving image distributing server 12, is included in the play time management data. This for example makes it possible to verify on the basis of the moving image ID that the moving image registered in the moving image distributing server 12 is not a moving image resulting from some manipulation or tampering. Incidentally, the moving image ID may be identifying information of the moving image distributing server 12. With the conventional technology, it is difficult to verify whether or not a play time has been recorded illegally. In the present embodiment, as described above, the play moving image is generated without the user explicitly creating the play moving image, and the identifier of the play moving image is included in the play time management data. It therefore becomes easier to verify whether or not the play time has been recorded illegally.

Incidentally, the personal best time PB, the world best time WB, and the regional best time RB on the selection screen 22 shown in FIG. 4 may have links set to play moving images showing play contents at the times of these records being achieved. When the user performs an operation of selecting a link, the play moving image to which the link is set may be displayed, so that the user can view the play moving image.

In addition, rankings generated on the basis of play time management data including a regulation ID specified by the user may be displayed on the output section 14d of the client 14 in response to a request from the user. For example, ranks, associated player IDs, times indicated by total play length data, and the like may be arranged as a list in order of increasing time of the total play length data in the rankings.

In the present embodiment, as described above, a time between timing of occurrence of an event indicated by start event data and timing of occurrence of an event indicated by end event data, the start event data and the end event data being set in regulation data, is recorded as play time data. Thus, in the present embodiment, the play time in a game can be recorded according to settings without the user performing an explicit operation. In addition, in the present embodiment, a play moving image showing play contents of the game during the play time can be recorded together with the play time.

In addition, conventionally, a game not supporting a real-time speedrun, a time attack, or the like as a system within the game may not have a timer managed within the game. Therefore, in such a game, a player participating in the competition needs to measure a play time by an explicit operation. Even in such a case, the present embodiment enables a play time in the game to be recorded according to settings without the user performing an explicit operation.

In addition, with the conventional technology, a rule not supported as a system within a game is shared between players by a document or the like. Then, whether or not play is correctly performed according to the rule can only be determined by viewing a play moving image. Thus, with the conventional technology, it is difficult to ensure that a common rule is applied among players participating in a competition. However, according to the present embodiment, regulation data created by a player, an organizer, or the like is shared and used by a plurality of players, thus ensuring that a common rule is applied among players participating in a competition.

Incidentally, regulation images RP associated with part of regulation data stored in the client 14 used by the user and the regulation managing server 10 may be arranged on the selection page 22. For example, only regulation images RP associated with a game having a title possessed by the user may be arranged on the selection page 22. In addition, for example, only regulation images RP associated with regulation data in which all of the events set as values of timer event data are already achieved by the user may be arranged on the selection page 22. In addition, only regulation images RP associated with rules in which a controller that has been used by the client 14 before satisfies a usable device condition may be arranged on the selection page 22. In addition, only regulation images RP associated with a game that has been cleared by the user may be arranged on the selection page 22.

In addition, the user may be allowed to display the selection page 22 during the play of a game. In this case, only regulation images RP associated with the game may be arranged on the selection page 22. Alternatively, only regulation images RP associated with rules in which a timer event associated with a map or a stage during the play is set may be arranged on the selection page 22.

The registration of regulation data and the recording of a play time in the present embodiment will be further described in the following.

Figure 7:
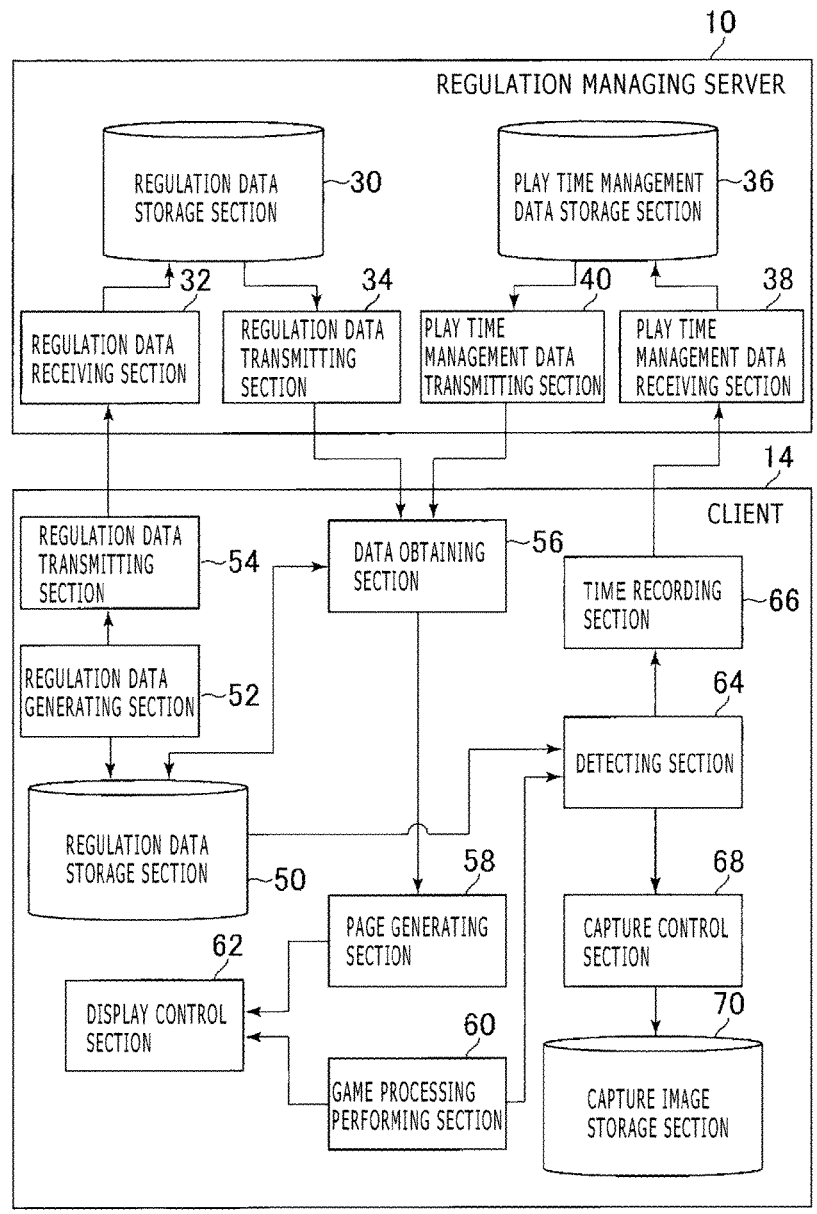
FIG. 7 is a functional block diagram showing an example of functions implemented by a regulation managing server and a client according to one embodiment of the present invention.

FIG. 7 is a functional block diagram showing an example of functions implemented by the regulation managing server 10 and the client 14 according to the present embodiment. It is to be noted that the regulation managing server 10 and the client 14 according to the present embodiment do not need to implement all of the functions shown in FIG. 7, and may implement functions other than the functions shown in FIG. 7.

The regulation managing server 10 according to the present embodiment functionally includes for example a regulation data storage section 30, a regulation data receiving section 32, a regulation data transmitting section 34, a play time management data storage section 36, a play time management data receiving section 38, and a play time management data transmitting section 40. The regulation data storage section 30 and the play time management data storage section 36 are implemented mainly in the storage section 10b. The other functions are implemented mainly in the communicating section 10c.

Then, the above functions are implemented by executing, in the control section 10a of the regulation managing server 10, a program including commands corresponding to the above functions, the program being installed on the regulation managing server 10 as a computer. This program is for example supplied to the regulation managing server 10 via a computer readable information storage medium such as an optical disk, a magnetic disk, a magnetic tape, a magneto-optical disk, or a flash memory, or via a computer network such as the Internet.

The client 14 according to the present embodiment functionally includes for example a regulation data storage section 50, a regulation data generating section 52, a regulation data transmitting section 54, a data obtaining section 56, a page generating section 58, a game processing performing section 60, a display control section 62, a detecting section 64, a time recording section 66, a capture control section 68, and a capture image storage section 70. The regulation data storage section 50 and the capture image storage section 70 are implemented mainly in the storage section 14b. The regulation data transmitting section 54 is implemented mainly in the communicating section 14c. The data obtaining section 56 and the time recording section 66 are implemented mainly in the control section 14a and the communicating section 14c. The capture control section 68 is implemented mainly in the control section 14a and the storage section 14b. The other functions are implemented mainly in the control section 14a.

Then, the above functions are implemented by executing, in the control section of the client 14, a program including commands corresponding to the above functions, the program being installed on the client 14 as a computer. This program is for example supplied to the client 14 via a computer readable information storage medium such as an optical disk, a magnetic disk, a magnetic tape, a magneto-optical disk, or a flash memory, or via a computer network such as the Internet.

The regulation data storage section 30 of the regulation managing server 10 stores regulation data.

The regulation data receiving section 32 of the regulation managing server 10 receives regulation data transmitted from the client 14, and stores the regulation data in the regulation data storage section 30.

The regulation data transmitting section 34 of the regulation managing server 10 transmits regulation data stored in the regulation data storage section 30 to the client 14.

The play time management data storage section 36 of the regulation managing server 10 stores play time management data.

The play time management data receiving section 38 of the regulation managing server 10 receives play time management data from the client 14, and stores the play time management data in the play time management data storage section 36.

The play time management data transmitting section 40 of the regulation managing server 10 transmits play time management data stored in the play time management data storage section 36 to the client 14.

The regulation data storage section 50 of the client 14 stores regulation data.

The regulation data generating section 52 of the client 14 generates setting data, for example regulation data in the present embodiment. For example, suppose that the registering button RB is clicked on the registration page 20 displayed on the client 14, the registration page 20 being illustrated in FIG. 3. In this case, in the present embodiment, the regulation data generating section 52 generates regulation data as described above on the basis of the input contents of the registration page 20. The regulation data generating section 52 then stores the regulation data in the regulation data storage section 50.

The regulation data transmitting section 54 of the client 14 transmits regulation data to the regulation managing server 10. For example, suppose that the sharing button SB is clicked on the registration page 20 displayed on the client 14, the registration page 20 being illustrated in FIG. 3. In this case, in the present embodiment, the regulation data generating section 52 generates regulation data as described above on the basis of the input contents of the registration page 20. The regulation data transmitting section 54 then transmits the regulation data to the regulation managing server 10. Then, the regulation data receiving section 32 of the regulation managing server 10 receives the regulation data, and stores the regulation data in the regulation data storage section 30.

The data obtaining section 56 of the client 14 obtains setting data in which an event is set, the event serving as timing of starting or ending measurement of a play time in a game to be played. As described above, a start event and an end event are set in regulation data as setting data according to the present embodiment. In addition, in the present embodiment, a rule violation to be detected is also set in the regulation data. In the present embodiment, when the selection page 22 is to be generated, the data obtaining section 56 obtains regulation data satisfying a predetermined condition from the regulation data storage section 50, and requests regulation data satisfying the predetermined condition from the regulation managing server 10. The data obtaining section 56 then obtains regulation data transmitted by the regulation data transmitting section 34 of the regulation managing server 10 in response to the request. Then, in the present embodiment, the data obtaining section 56 stores the obtained regulation data in the regulation data storage section 50. In addition, in the present embodiment, when the selection page 22 is to be generated, the data obtaining section 56 requests play time management data associated with the obtained regulation data from the regulation managing server 10. The data obtaining section 56 then obtains the play time management data transmitted by the play time management data transmitting section 40 of the regulation managing server 10 in response to the request. As described above, in the present embodiment, the regulation data transmitted to the regulation managing server 10 by the regulation data transmitting section 54 of the client 14 is obtained by another client 14. The regulation data transmitting section 54 according to the present embodiment thus has a role of transmitting setting data to a device that records a time between timing of occurrence of an event set in the setting data and predetermined timing.

The page generating section 58 of the client 14 generates various kinds of pages such for example as the registration page 20, the selection page 22, and the detail page 24. In the present embodiment, the page generating section 58 generates the selection page 22 on the basis of the regulation data and the play time management data obtained by the data obtaining section 56. In addition, the page generating section 58 generates the detail page 24 on the basis of regulation data associated with a selected regulation image RP.

The game processing performing section 60 of the client 14 executes the program of a game installed on the client 14. In this case, when an environment data file is included in the selected regulation data, the game execution processing section 60 loads the environment data file and reproduces a game environment represented by the environment data, and thereafter executes the program of the game. In this case, the game processing performing section 60 has a role of a loading section loading environment data and reproducing a game environment represented by the environment data.

The display control section 62 of the client 14 displays a page generated by the page generating section 58 on the output section 14*d*. In addition, during the play of the game executed by the game processing performing section 60, the display control section 62 of the client 14 displays a play image showing play contents of the game on the output section 14*d* of the client 14 at a predetermined frame rate. In addition, in the present embodiment, a copy of the displayed play image, that is, a copy of the play image rendered in the frame buffer is sequentially written to a ring buffer area provided in the storage section 14*b* of the client 14, the ring buffer area being capable of storing a moving image for 15 minutes at a maximum.

The detecting section 64 of the client 14 detects the occurrence of an event set in the obtained setting data during the execution of the program of the game by the game processing performing section 60. In the present embodiment, the detecting section 64 for example detects the occurrence of a start event and the occurrence of an end event, the start event and the end event being indicated by time event data included in the selected regulation data. In addition, in the present embodiment, the detecting section 64 also detects the occurrence of the above-described rule violation set in the selected regulation data. Incidentally, the detecting section 64 may stop detecting the occurrence of an event set in the setting data in response to detection of an occurrence of the rule violation.

The time recording section 66 of the client 14 records time data indicating a time between the timing of occurrence of the detected event and the predetermined timing. In the present embodiment, for example, the time recording section 66 generates play time management data including play time data indicating a time from timing of the occurrence of the start event to timing of the occurrence of the end event, the occurrence of the start event and the occurrence of the end event being detected by the detecting section 64. The time recording section 66 then transmits the play time management data to the regulation managing server 10. The play time management data receiving section 38 of the regulation managing server 10 receives the play time management data, and stores the play time management data in the play time management data storage section 36. Incidentally, when the game processing performing section 60 loads environment data, the time recording section 66 may record time data indicating a time between timing in which the environment data is loaded and the predetermined timing. In addition, in the present embodiment, the time recording section 66 may record, in association with the time data, data indicating occurrence or nonoccurrence of a rule violation in a period between the timing of occurrence of the start event or the end event and the predetermined timing. Specifically, for example, the time recording section 66 may record, in association with the time data, data indicating occurrence or nonoccurrence of a rule violation in a period between the timing of occurrence of the start event and the timing of occurrence of the end event. As described above, in the present embodiment, all of the generated play time management data is transmitted to the regulation managing server 10. Incidentally, as described above, some of the generated play time management data is associated with regulation data that is not stored in the regulation managing server 10 but is stored in the regulation data storage section 50 of the client 14. Such play time management data may be stored in the storage section 14b, for example the regulation data storage section 50, of the client 14 without being transmitted to the regulation managing server 10.

The capture control section 68 of the client 14 stores a play moving image in the capture image storage section 70 when the value of moving image saving necessity data included in the selected regulation data is "1." In the present embodiment, the capture control section 68 for example stores a play moving image from the timing of occurrence of the start event indicated by start event data included in the selected regulation data to the timing of occurrence of the end event indicated by end event data included in the selected regulation data. In this case, for example, the play moving image including, as a frame image, at least one play image written to the above-described ring buffer area may be copied from the ring buffer area to the capture image storage section 70. Thus, in the present embodiment, the capture control section 68 has a role of a moving image recording section that records, in association with the time data, a moving image showing play contents of the game between the timing of occurrence of the event and the predetermined timing.

The capture image storage section 70 of the client 14 stores the play moving image.

In the present embodiment, the regulation data storage section 50, the regulation data generating section 52, the regulation data transmitting section 54, the data obtaining section 56, the page generating section 58, the detecting section 64, and the time recording section 66 are implemented as a play time control module operating in the client 14. In addition, in the present embodiment, the capture control section 68 and the capture image storage section 70 are implemented as a capture control module operating in the client 14. Incidentally, the play time control module may be implemented as a system program operating as a base for the game program, or may be implemented as part of the game program. In addition, similarly, the capture control module may be implemented as the system program operating as the base for the game program, or may be implemented as part of the game program.

Figure 8:
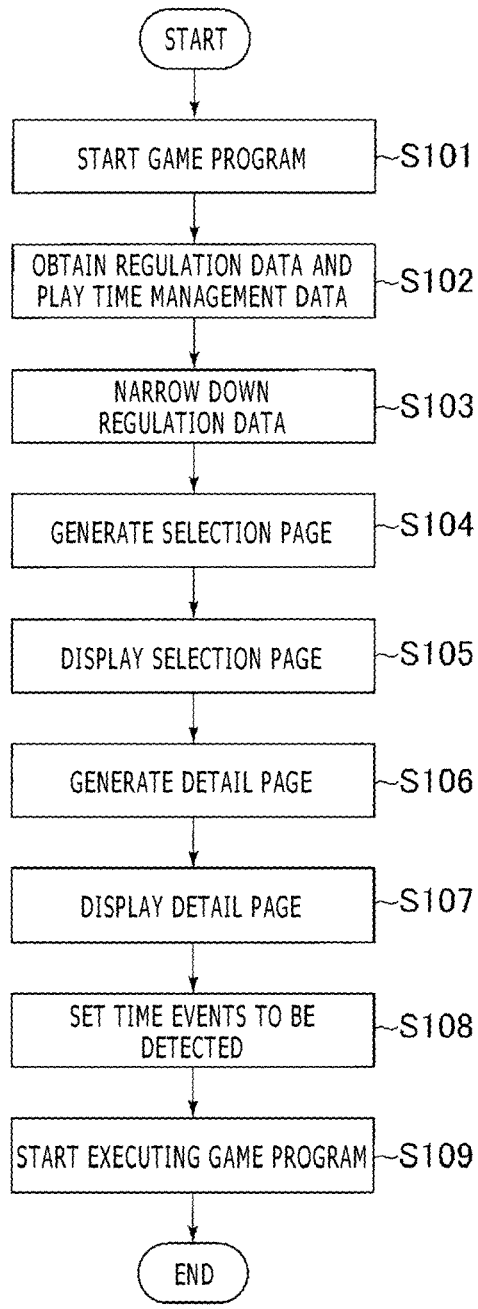
FIG. 8 is a flowchart showing an example of a flow of processing performed by the client according to one embodiment of the present invention.

An example of a flow of processing of setting a game in which to record a play time, which processing is performed in the client 14 according to the present embodiment, will be described in the following with reference to a flowchart of FIG. 8.

First, when the user performs an operation of starting the program of the game, the game processing performing section 60 starts the program of the game (S101). Then, when the user performs an operation of displaying the selection page 22, the data obtaining section 56 obtains regulation data and play time management data (S102). At this time, for example, data associated with the program of the game started in the processing shown in S101 may be obtained.

Then, the page generating section 58 narrows down the regulation data obtained in the processing shown in S102 to regulation data to be displayed (S103). For example, the narrowing down to the regulation data to be displayed is performed on the basis of a controller that has been connected to the client 14 before or is connected to the client 14, an installed program, and stored save data and stored trophy data. In this case, for example, the narrowing down may be performed to only regulation data indicating a rule in which the use of a controller that has been connected to the client 14 before is a condition. Alternatively, for example, the narrowing down may be performed to only regulation data indicating a rule in which the use of a controller that is connected to the client 14 is a condition. Alternatively, for example, the narrowing down may be performed to only regulation data with regard to the program started in the processing shown in S101 or the installed program. Alternatively, for example, the narrowing down may be performed to only regulation data with regard to a game whose save data is stored. In addition, for example, the narrowing down may be performed to only regulation data in which all of the set time events are already achieved by the user. In addition, for example, the narrowing down may be performed to only regulation data in which all of the set time events are events with regard to a map or a stage already cleared by the user.

Then, the page generating section 58 generates the selection page 22 illustrated in FIG. 4 on the basis of the regulation data to which the narrowing down is performed in the processing shown in S103 and the play time management data associated with the regulation data (S104). Then, the display control section 62 displays the selection page 22 generated in the processing shown in S104 (S105). Here, when the user performs an operation of selecting one of regulation images RP, the page generating section 58 generates the detail page 24 associated with the selected regulation image RP (S106). Then, the display control section 62 displays the detail page 24 (S107). Here, when the user clicks the OK button OB, time events set in the regulation data associated with the detail page 24 are set as objects of detection by the detecting section 64 (S108). The game processing performing section 60 then starts to execute the program of the game started in the processing shown in S101 in response to a game play start operation by the user (S109). The processing shown in the present processing example is then ended. Incidentally, when the selected regulation data includes an environment data file, the game processing performing section 60 loads the environment data file in the processing shown in S109, and then starts to execute the program of the game.

An example of a flow of processing of recording a play time on the basis of the selected regulation data, which processing is performed by the client 14 according to the present embodiment, will be described in the following with reference to a flowchart of FIG. 9. The following description will be made by taking as an example a case where the selected regulation data includes one combination of start event data and end event data. In addition, suppose that the value of the moving image saving necessity data included in the regulation data is "1."

First, the detecting section 64 monitors for an event indicated by the value of first start event data included in the selected regulation data until the event is detected. The detecting section 64 also monitors for the above-described rule violation while performing the above-described monitoring (S201). Then, when the detection of the event is detected, the time recording section 66 records timing of detection of the event as a value of first starting timing data, and starts to measure a play time by starting a timer (S202). The capture control section 68 then starts to capture a play moving image (S203).

Then, the detecting section 64 monitors for an event indicated by the value of first end event data included in the selected regulation data until the event is detected. The detecting section 64 also monitors for the above-described rule violation while performing the above-described monitoring (S204). Then, when the detection of the event is detected, the time recording section 66 records timing of detection of the event as a value of first ending timing data. In addition, the time recording section 66 ends the timer started in the processing shown in S203, and records a time measured by the timer as a value of play time length data (S205). The capture control section 68 then ends the capturing of the play moving image (S206). The thus captured play moving image is stored in the capture image storage section 70.

Then, the capture control section 68 transmits the play moving image stored in the capture image storage section 70 to the moving image distributing server 12 (S207). The play moving image is stored in the moving image distributing server 12. At this time, the capture control section 68 obtains a moving image ID of the play moving image from the moving image distributing server 12.

Then, the time recording section 66 generates play time management data on the basis of data on the recorded play time and the obtained moving image ID, and transmits the play time management data to the regulation managing server 10 (S208). The processing shown in the present processing example is then ended. In this case, for example, the value of the play time length data recorded in the processing shown in S205 is set as a value of total play time length data included in the play time management data. The thus transmitted play time management data is stored in the regulation managing server 10.

Incidentally, when an occurrence of the rule violation is detected in the processing shown in S201, the processing shown in the present processing example is ended. In addition, when an occurrence of the rule violation is detected in the processing shown in S204, the event detection and the play time recording are canceled (S209), and the processing shown in the present processing example is ended. In this case, in the present embodiment, the timer is stopped, and the first starting timing data, the first ending timing data, the total play time length data, and the like that have been recorded thus far are cleared.

In addition, when the value of the moving image saving necessity data included in the selected regulation data is "0," the processing shown in S203, S206, and S207 described above is not performed. In addition, uploading of the play moving image and transmission of the play time management data may be performed in response to a request from the user. Incidentally, in the processing shown in S203 described above, timing of starting to capture the play moving image may be a predetermined time before or a predetermined time after timing of starting to measure the play time, or for example a predetermined time before or a predetermined time after timing of detection of the start event in this case. In addition, in the processing shown in S206 described above, timing of ending the capturing of the play moving image may be a predetermined time before or a predetermined time after timing of ending the measurement of the play time, or for example a predetermined time before or a predetermined time after timing of detection of the end event in this case. More specifically, for example, a play moving image from a few seconds before timing of occurrence of the start event to a few seconds after timing of occurrence of the end event may be saved. This is made possible by the client 14 according to the present embodiment by sequentially writing a copy of the play image rendered in the frame buffer to the above-described ring buffer area, as described above.

Figure 9:
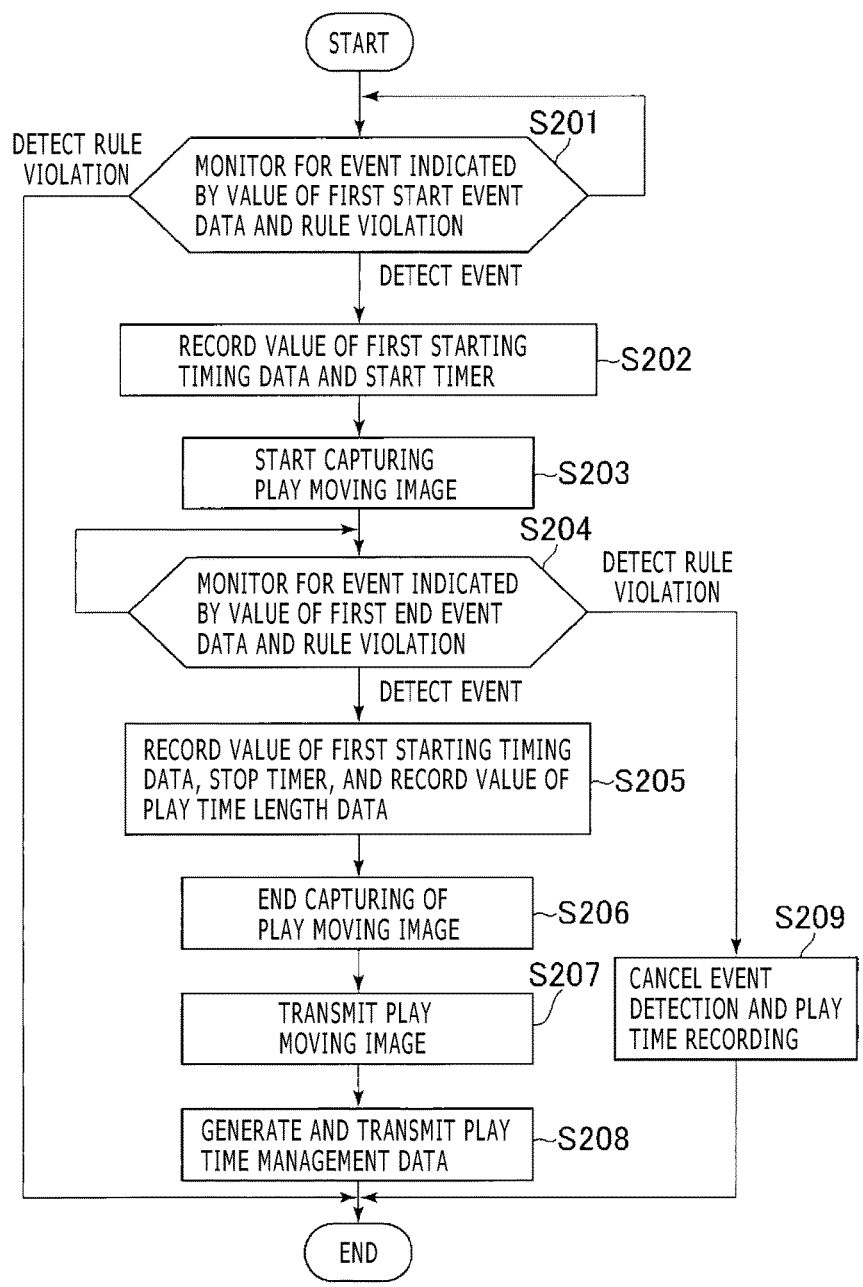
FIG. 9 is a flowchart showing an example of a flow of processing performed by the client according to one embodiment of the present invention.
Figure 10:
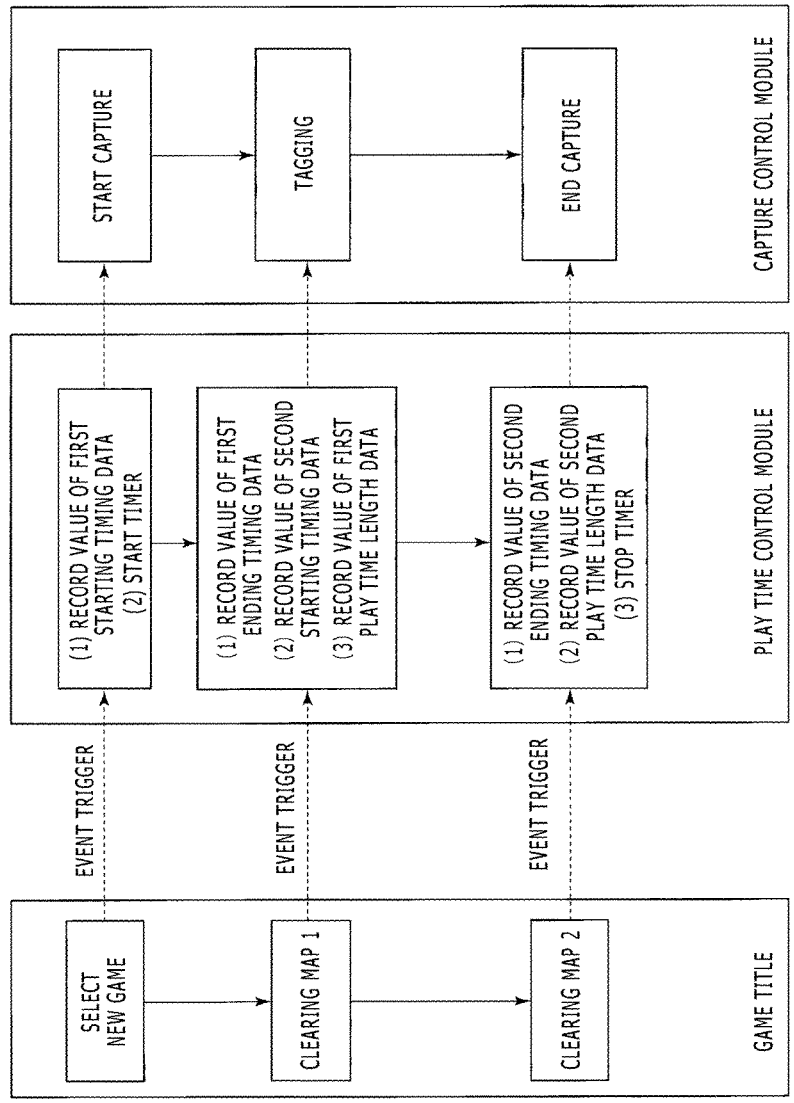
FIG. 10 is a diagram schematically showing a concrete example in which the processing shown in FIG. 9 is performed.

FIG. 10 to FIG. 12 are diagrams each schematically showing a concrete example in which the processing shown in FIG. 9 is performed.

As shown in FIG. 2A, a plurality of combinations of start event data and end event data may be included in regulation data. In this case, with detection of an event indicated by certain start event data as a trigger, monitoring for an event indicated by start event data assigned a number following that of the certain start event data may be started. That is, the processing shown in FIG. 9 may be performed for the start event data assigned the following number. This can prevent recording of a play time on the basis of second start event data and second end event data when an event indicated by the second start event data occurs before the occurrence of an event indicated by first start event data, for example. Then, in this case, a plurality of play moving images associated with the combinations of the start event data and the end event data may be generated. In addition, for example, when first end event data and the second start event data indicate a same event, the capture control section 68 may generate a moving image in which timing of occurrence of the event indicated by the first end event data is tagged, as shown in FIG. 10.

Suppose for example that the value of usable controller data included in selected regulation data is "ONLY STANDARD CONTROLLER." In this case, when the user changes a controller being used during the play of a game from a standard controller to a nonstandard controller, the processing shown in the present processing example is ended according to detection of the connection of the nonstandard controller by the detecting section 64, as shown in FIG. 11. At this time, the display control section 62 may display information indicating that the play time is not recorded due to the rule violation on the output section 14*d*.

In addition, the play time may be recorded even when the occurrence of the rule violation is detected. Then, in this case, data indicating that the rule violation occurred may be associated with generated play time management data.

In addition, as shown in FIG. 12, when a game suspending operation is performed during the measurement of a play time, the timer and the capturing of a play moving image are temporarily stopped during a period from timing of the suspending operation to timing of a returning operation. Therefore, it cannot be determined from the play moving image that the suspending operation was performed. Accordingly, in a case where a game was suspended during the measurement of a play time, data indicating that the game was suspended may be associated with generated play time management data. Incidentally, the suspending of a game by the user during the measurement of a play time may be set as the above-described rule violation. That is, "SUSPENDING IS PROHIBITED" or the like may be allowed to be set as the above-described condition data. In a case where "SUSPENDING IS PROHIBITED" is set as the above-described condition data, suspending the game during the measurement of a play time, for example, constitutes the rule violation, so that the play time is not recorded. Also in a case where a game was paused during the measurement of a play time, data indicating that the game was paused may be associated with generated play time management data, or the pausing of the game during the measurement of a play time may be treated as a rule violation, for example.

In addition, an index image indicating the contents of regulation data and indicating whether or not a rule violation, suspending, pausing, and the like occurred may be included as frame images of a predetermined number of frames from a start of a play moving image uploaded to the moving image distributing server 12. In addition, an image showing a comment input by the user when uploading a moving image may be included as frame images of a predetermined number of frames from an end of the moving image. Specifically, for example, in a case where an occurrence of a rule violation is detected, an image indicating that the rule violation occurred may be included in frame images of a predetermined number of frames from the start of the play moving image or frame images of a predetermined number of frames from the end of the moving image. In addition, for example, in the case where the occurrence of the rule violation is detected, an image indicating the occurrence of the rule violation may be included in a frame image displayed in timing of the occurrence of the rule violation.

In addition, for example, the user may be allowed to select other regulation data while a play time is being measured on the basis of certain regulation data. In this case, the processing shown in FIG. 9 is performed in parallel for the plurality of pieces of regulation data.

It is to be noted that the present invention is not limited to the foregoing embodiment.

For example, one of start event data and end event data does not need to be included in regulation data. In a case where regulation data does not include start event data, for example, the measurement of a play time may be started by an explicit operation by the user. In addition, in a case where regulation data does not include end event data, for example, the measurement of a play time may be ended by an explicit operation by the user.

For example, each of the regulation managing server 10, the moving image distributing server 12, and the client 14 may be constituted of a plurality of casings. In addition, the roles assigned to the regulation managing server 10, the moving image distributing server 12, and the client 14 are not limited to the above-described roles.

In addition, the above concrete character strings and the concrete character strings in the drawings are illustrative, and are not limited to these character strings.

The invention claimed is:

1. A play time recording method for controlling a play time recording device having a processor, the play time recording method comprising:
    obtaining, using the processor, from a managing server storing a plurality of setting data, first setting data in which an event and a rule to be detected are set, the event serving as timing of starting or ending measurement of a play time in a game to be played, the rule being related to a required controller for play of the game,
    wherein the game is executed on the play time recording device separate from the managing server;
    detecting, using the processor, an occurrence of the event set in the first setting data during the play of the game;
    recording, using the processor, time data indicating a time between timing of the occurrence of the event and a predetermined timing;
    detecting a presence or an absence of the required controller in the time between the timing of the occurrence of the event and the predetermined timing; and
    recording, in association with the time data, data indicating the presence or the absence of the required controller in the time between the timing of the occurrence of the event and the predetermined timing.

2. The play time recording method according to claim 1, wherein
    the first setting data comprises a start event, a second event, and an end event,
    wherein a first timing of the start event is used as the timing of the occurrence of the event, and
    wherein a second timing of the second event is recorded, and wherein a third timing of the end event is used as the predetermined timing
    wherein the play time recording method further comprises:
    detecting an occurrence of the start event, an occurrence of the second event, and an occurrence of the end event, during the play of the game.

3. The play time recording method according to claim 1, further comprising
    recording, using the processor, in association with the time data, a moving image showing play contents of the game between the timing of the occurrence of the event and the predetermined timing.

4. The play time recording method according to claim 1, wherein the first setting data includes environment data indicating an environment of the game at a time of starting the measurement of the play time,
    wherein the play time recording method further comprises:
    loading the environment data and reproducing the environment of the game, the environment being indicated by the environment data; and
    recording the time data indicating a time between timing in which the environment data is loaded and the predetermined timing.

5. A play time recording method comprising:
    obtaining first setting data, over a network from a managing server storing a plurality of setting data, in which an event and a rule to be detected are set, the event serving as timing of starting or ending measurement of a play time in a game to be played, the rule being related to a required controller usable for play of the game, wherein the game is executed and controlled by a user using a play time recording device separate from the managing server;

detecting an occurrence of the event set in the first setting data during the play of the game; and recording time data indicating a time between timing of the occurrence of the event and a predetermined timing;

the detecting detecting an occurrence of an incident related to the rule set in the first setting data in the time between the timing of the occurrence of the event and the predetermined timing;

the recording recording, in association with the time data, data indicating occurrence or nonoccurrence of the incident related to the rule in the time between the timing of the occurrence of the event and the predetermined timing; and transmitting the time data to the managing server for storage, wherein the time data is not transmitted to the managing server if a controller other than the required controller is detected in the time between the timing of the occurrence of the event and the predetermined timing.

6. A play time recording method comprising:

selecting first setting data from a plurality of setting data over a network from a managing server, wherein the first setting data includes a first event, a second event, and a third event;

downloading the first setting data from the managing server;

recording first timing data of the first event;

recording second timing data of the second event, wherein a start timing of the second event does not coincide with an end timing of the first event;

recording third timing data of the third event, wherein the second event occurs before the third event but after the first event;

calculating a total timing by summing the first timing data, the second timing data, and the third timing data;

transmitting the first timing data, the second timing data, the third timing data, the total timing data, a user identification, and a game identifier of the game to the managing server; and ranking the total timing data against other total timing data received from other users different than the user, wherein the first setting data includes at least one rule related to a required controller, wherein the transmitting does not occur if a controller other than the required controller is detected at any point during the first timing data, the second timing data, and the third timing data.

7. The play time recording method according to claim 6, wherein an end timing of the third timing data occurs a predetermined period after a start time of the third timing data.

* * * * *